(12) United States Patent
Kapur et al.

(10) Patent No.: US 11,125,450 B2
(45) Date of Patent: Sep. 21, 2021

(54) ROOM SPACE COOLING WITH IMPROVED THERMAL STORAGE

(71) Applicant: TWYCE ENERGY LTD., Boulder, CO (US)

(72) Inventors: Rajan Kapur, Boulder, CO (US); Vikram Murthy, Mumbai (IN); Jay R Akhave, Claremont, CA (US)

(73) Assignee: Twyce Energy Ltd, Boulder, CO (US)

( * ) Notice: Subject to any disclaimer, the term of this patent is extended or adjusted under 35 U.S.C. 154(b) by 0 days.

(21) Appl. No.: 16/328,997

(22) PCT Filed: Jul. 30, 2017

(86) PCT No.: PCT/US2017/044565
§ 371 (c)(1),
(2) Date: Feb. 27, 2019

(87) PCT Pub. No.: WO2018/044452
PCT Pub. Date: Mar. 8, 2018

(65) Prior Publication Data
US 2019/0195519 A1 Jun. 27, 2019

Related U.S. Application Data

(60) Provisional application No. 62/380,830, filed on Aug. 29, 2016.

(51) Int. Cl.
*F24F 5/00* (2006.01)
*F25D 16/00* (2006.01)
*F25B 39/02* (2006.01)

(52) U.S. Cl.
CPC .... *F24F 5/0017* (2013.01); *F24F 2005/0025* (2013.01); *F25B 39/02* (2013.01); *F25D 16/00* (2013.01); *Y02E 60/14* (2013.01)

(58) Field of Classification Search
CPC . F24F 2005/0025; F24F 5/0017; F25B 39/02; F25D 16/00; Y02E 60/147
USPC ............................................................ 62/59
See application file for complete search history.

(56) References Cited

U.S. PATENT DOCUMENTS

| | | | | |
|---|---|---|---|---|
| 4,406,138 A | * | 9/1983 | Nelson | F25D 17/02 62/305 |
| 5,255,526 A | * | 10/1993 | Fischer | F24F 5/0017 62/59 |
| 5,381,671 A | * | 1/1995 | Saito | F24F 5/0017 62/430 |
| 6,474,089 B1 | * | 11/2002 | Chen | B60H 1/00428 62/235.1 |
| 2011/0042471 A1 | * | 2/2011 | Futaeda | F24D 3/18 236/51 |
| 2012/0041569 A1 | * | 2/2012 | Zhang | G06F 30/13 700/17 |
| 2012/0241122 A1 | * | 9/2012 | Xiang | C09K 5/04 165/10 |
| 2014/0166232 A1 | * | 6/2014 | Al-Hallaj | F24T 10/10 165/11.1 |
| 2014/0174080 A1 | * | 6/2014 | Friesth | F01K 3/00 60/641.1 |

(Continued)

Primary Examiner — Henry T Crenshaw
(74) Attorney, Agent, or Firm — Jay R Akhave

(57) ABSTRACT

A thermal storage system, capable of storing and releasing thermal energy, with a radiative heat exchange outer surface and a method of operating the device to cool a room-space without using a circulating refrigerant in the room cooling step.

16 Claims, 5 Drawing Sheets

Current Art Practice

(56) References Cited

U.S. PATENT DOCUMENTS

2016/0018151 A1* 1/2016 Tansley .................. F25D 17/02
                                                                         62/62
2019/0195519 A1* 6/2019 Kapur .................. F24F 5/0017

* cited by examiner

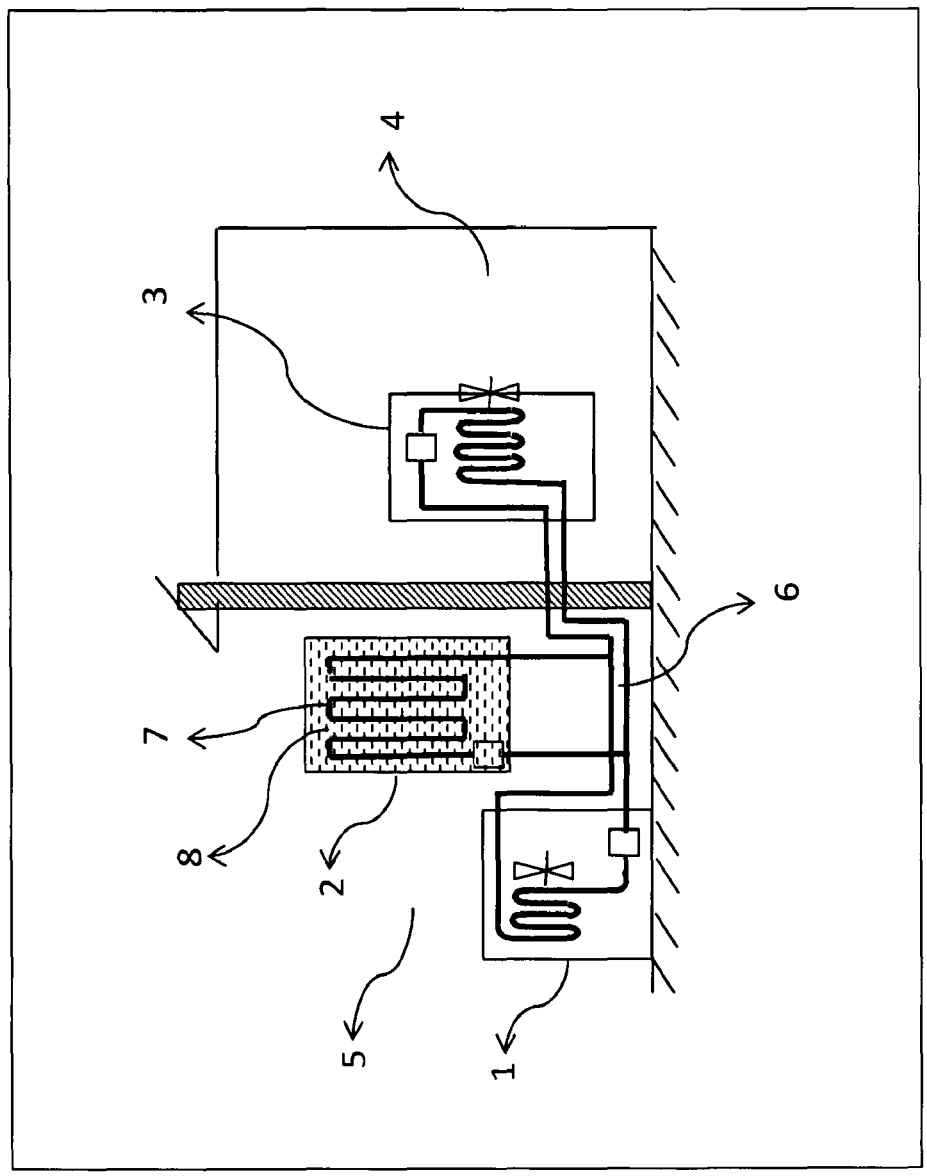
FIGURE 1  Current Art Practice

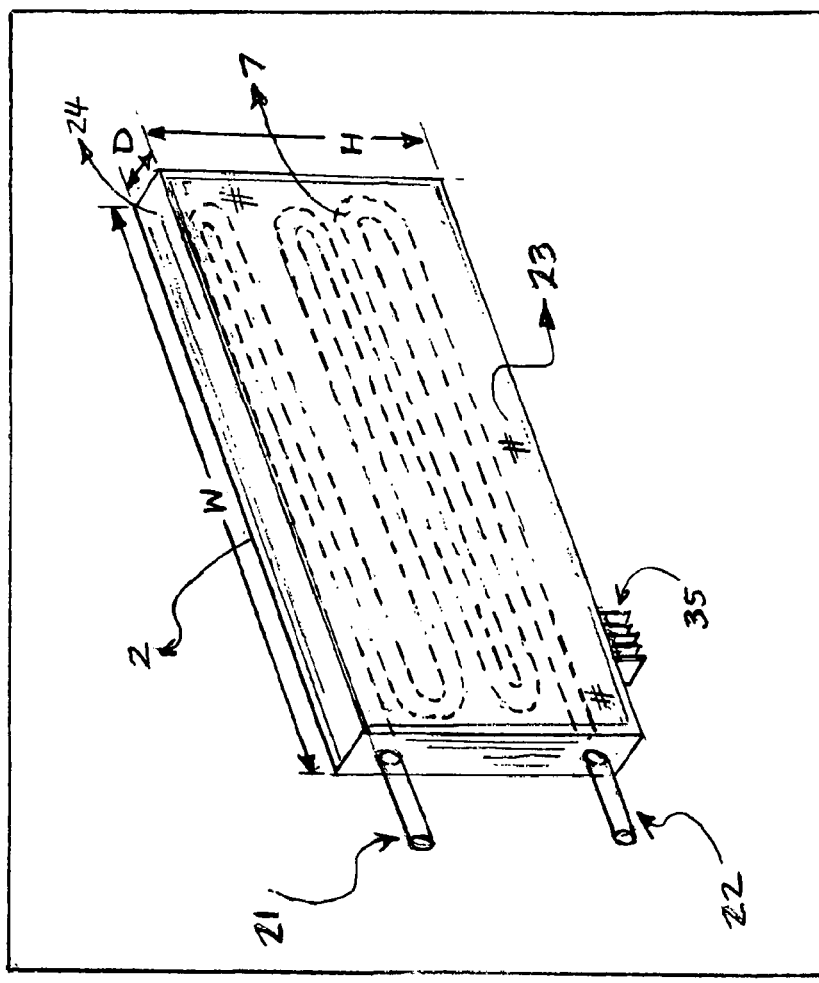
FIGURE 2  Improved Thermal Storage Tank

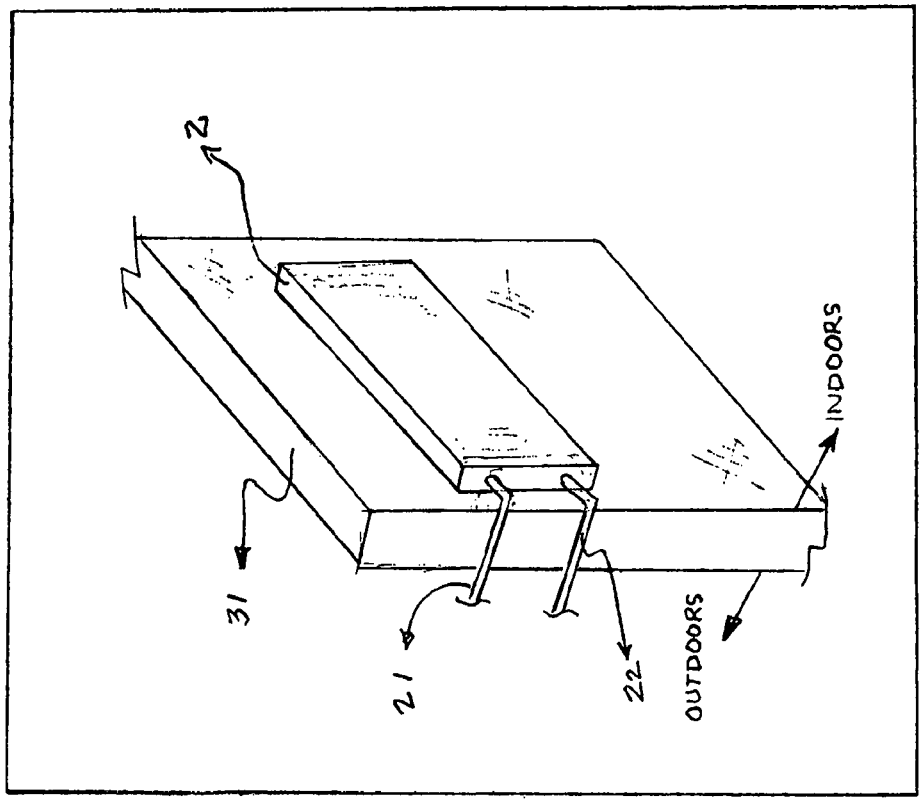
FIGURE 3(a) Thermal Storage Tank placement Inside room-space

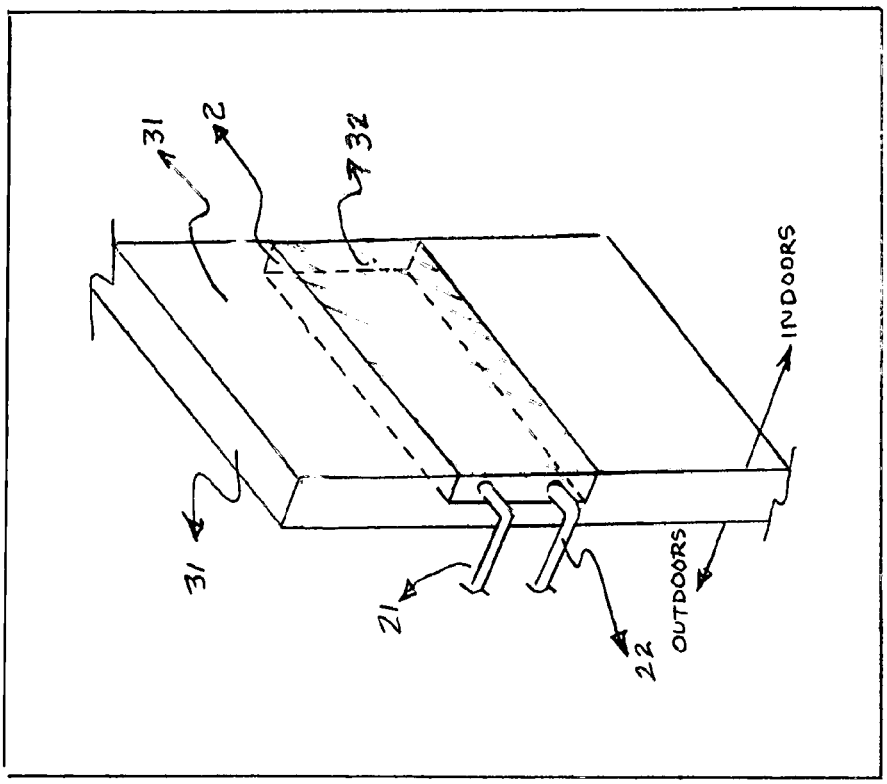
FIGURE 3(b)  Thermal Storage Tank placement proximate to room-space

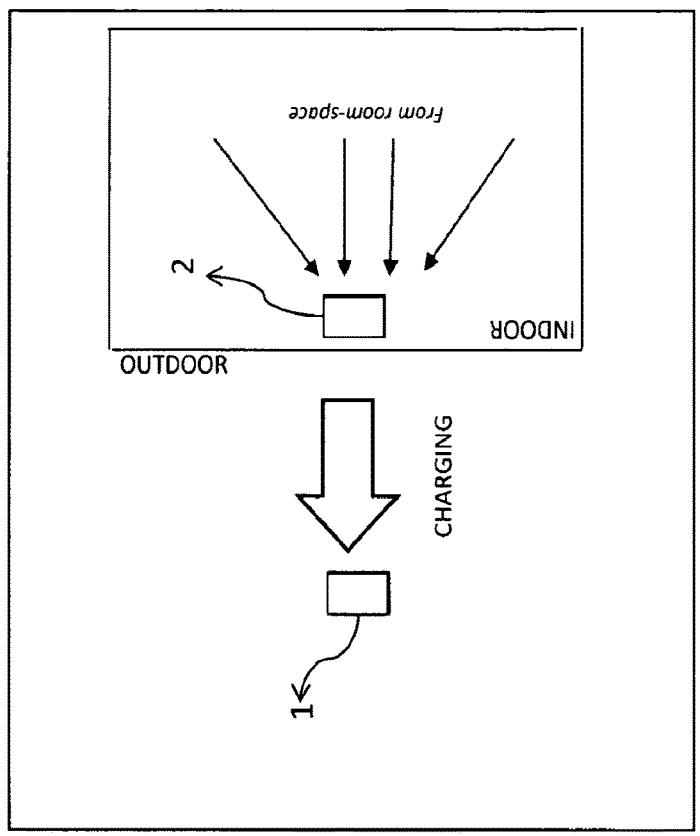
FIGURE 4(b) Heat Flow in one embodiment of the invention
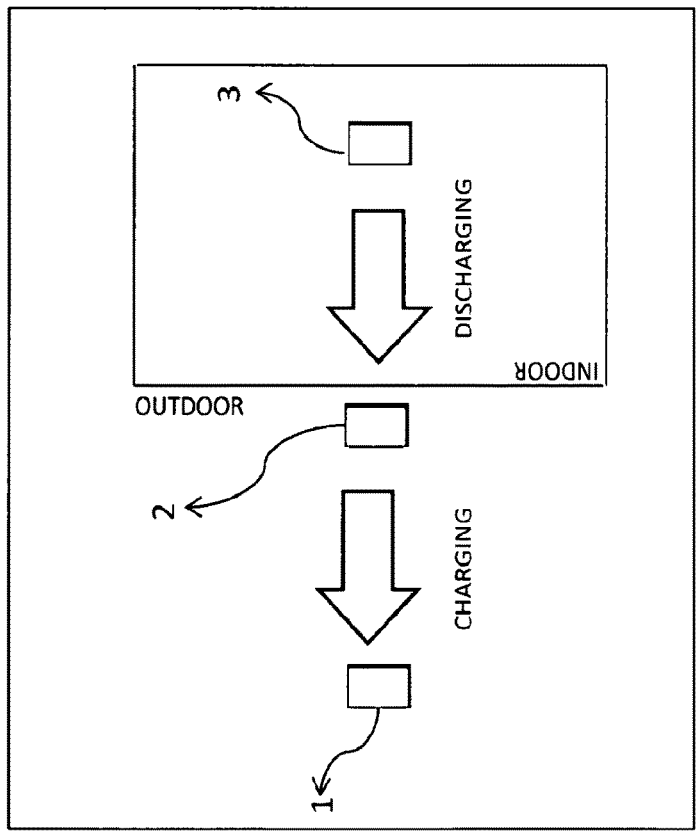
FIGURE 4(a) Heat Flow in Current Art

ROOM SPACE COOLING WITH IMPROVED THERMAL STORAGE

CROSS-REFERENCE TO RELATED APPLICATIONS

This application claims the benefit of U.S. Provisional Patent Application No. 62/380,830 filed Aug. 29, 2016.

FIELD OF INVENTION

This invention relates to an improved design of a thermal storage tank as part of a thermal storage system to provide space conditioning to a room-space, wherein the thermal storage tank has a heat exchange surface for cooling a room-space.

More specifically it provides for a novel positioning of the thermal storage tank by advantageously locating the thermal storage tank in or proximate to the room-space to be cooled.

Additionally, the thermal storage system employs a refrigerant-free thermal transfer between the thermal storage in the tank and the room-space to cool the room-space.

Additionally, the thermal storage tank performs cooling of a room-space with no electric power.

BACKGROUND OF THE INVENTION

Room conditioning equipment needs to operate on demand and preferably through all electric power fluctuations.

Energy storage provides a convenient solution to mitigate electric power fluctuations. Some of these fluctuations are a result of poor grid management, inadequate generation capacity to meet demand or intermittency of renewable power generation sources. Energy storage when beneficially operated can also limit power demand charges and provide savings through electricity arbitrage.

Thermal storage is less costly than electrochemical storage and is increasingly being adopted for room conditioning application. Thermal energy storage is like a battery for a building's air-conditioning system. It uses standard cooling equipment, plus an energy storage tank to shift all or a portion of a building's cooling needs to off-peak, night time hours. During periods when electricity is readily or cheaply available, ice is made and stored inside thermal energy storage tanks. The stored ice is then used to cool the building occupants the next day.

Current art teaches the use of thermal storage to cool room-spaces. Ice Energy Inc. uses a refrigerant system both to make the ice in its thermal storage tank during an 'ice-charging' step and to transfer the stored thermal energy from the melting ice in its thermal storage tank to an evaporator in an air conditioner unit during a subsequent 'ice-cooling' step. Similarly, Calmac Inc. uses refrigerant both to make the ice in their storage tank and to transfer the thermal energy from stored ice in their storage tank to a cooling coil in an air conditioner unit.

U.S. Pat. No. 4,735,064 to Fischer teaches an energy storage system for use in room temperature conditioning. It describes an evaporator unit which is positioned in the space to be temperature conditioned. During the ice-cooling step, the coils of the thermal storage system supply refrigerant to the evaporator unit in the room-space. The transfer of thermal energy between the room-space and the thermal storage takes place via a circulating refrigerant.

Current art thermal storage systems need a circulating refrigerant through either an evaporator or some kind of heat exchanger to do ice-cooling of a room-space. Current thermal storage systems thus need power for the ice-cooling step to cool a room-space.

This is a big limitation when power is not available.

Thus, there is a need for an improved thermal storage system design that allows an ice-cooling step without the need of a circulating refrigerant.

There is also a need to be able to conduct ice-cooling step with a thermal storage unit in the event of a total power loss.

There is also always a need to conduct the ice-cooling step with less power for improved energy efficiency of thermal storage device.

OBJECTS OF THE INVENTION

It is an object of this invention to provide a thermal storage device capable of transmitting its stored thermal energy to a room-space for cooling without the use of a refrigerant.

It is another object to provide a thermal storage device capable of transmitting its stored thermal energy for room-space cooling when no power is available.

It is still another object to provide a thermal storage device with a built-in heat exchange surface.

It is yet another object to provide a power efficient room cooling system.

BRIEF SUMMARY OF THE INVENTION

An improved thermal storage device comprises of thermal storage tank with a novel outer surface capable of heat exchange with its environment. The tank is placed inside or proximate to a room-space needed to be cooled with the outer surface of the tank exposed to the room-space. The thermal storage is accomplished with a phase change medium (PCM) such as water. In a 'CHARGING' mode, the PCM is frozen by an external refrigeration apparatus. In a 'DISCHARGING' mode, the frozen PCM melts from the heat absorbed via the surface of the device exposed to the room-space. The DISCHARGING mode provides continuous cooling to the room-space. The storage device can be repeatedly charged and discharged to benefit in various economic ways.

In one aspect of the invention no refrigerant is used in the ice-cooling or the DISCHARGING step in operating the thermal storage system.

In another aspect of the invention the thermal storage device has a surface capable of efficient radiative thermal exchange with the objects in the isolated space.

In yet another aspect of the invention, the radiative surface of the thermal storage is maintained at or below dew-point of the room-space.

In yet another aspect of the invention, no power is required to run the thermal storage in the DISCHARGING mode.

In yet another aspect of the invention the novel thermal storage device can provide cooling to a room-space at a lower cost due to savings from lowered electricity use.

In yet another aspect the thermal storage device, in its DISCHARGING step, can provide room cooling when electric power is unavailable.

BRIEF DESCRIPTION OF DRAWINGS

FIG. 1 Current Art Practice.
FIG. 2 Improved thermal storage tank.

FIG. 3(a) Thermal storage tank placement inside room-space.

FIG. 3(b) Thermal storage tank placement proximate to room-space.

FIG. 4(a) Heat Flow in Current Art.

FIG. 4(b) Heat Flow in one embodiment of the invention.

DETAILED DESCRIPTION OF THE INVENTION

In current art, a thermal storage system charges with ice when power is available. It is subsequently run in ice-cooling mode whenever needed. The thermal storage is located outside the room-space. In ice cooling mode a refrigerant circuit is run between the thermal storage to the evaporator coils or exchanger coils to cool the room-space.

Two distinct steps are typical.—ice charging step and ice-cooling step. Ice charging can alternatively be called charging or freezing step. Ice-cooling is alternatively called room-space cooling step, ice melting step, discharging step. The charging step freezes the ice and the ice-cooling step provides cooling to the room-space by the melting ice.

A thermal storage system has a tank containing PCM. When water is used as the PCM, ice is formed when thermal storage is charged and ice is melted when the thermal storage is discharged.

In a charging mode, the water in the tank is frozen, by circulating refrigerant through it from a refrigeration apparatus. The refrigeration apparatus may be driven by an intermittent source of electricity. In a discharging mode, the ice melts in the tank from the heat absorbed from the isolated space to be cooled. In current art, a coil evaporator circulating a refrigerant is used to transport the heat to the melting ice in the tank. This provides continuous cooling to the isolated space. The thermal storage system may operate either in a charging or discharging or both charging and discharging modes simultaneously.

Our thermal storage tank is advantageously located inside or proximate to a room-space that is to be cooled, with an outer heat transfer surface section capable of radiative heat transfer with the room-space that is to be cooled.

In this novel thermal storage system, the charging mode is similar to current art—the water is frozen by circulating refrigerant through it from a refrigeration apparatus. The refrigeration apparatus may be driven by an intermittent source of electricity. The discharging mode is novel—the ice melts from heat absorbed from the isolated space through heat transfer surfaces proximate to, or integrated with the thermal storage apparatus. This provides continuous cooling to the isolated space. The apparatus may operate in charging, discharging, or both charging and discharging modes simultaneously.

FIG. 1 shows a current art thermal storage in conjunction with a room cooling application. It has three major components—a compressor/condenser 1, a storage tank 2 and an expander/evaporator 3. The tank 2 has an internal coil 7 for circulating a refrigerant through the tank 2. Tank 2 is filled with phase change material 8. The coil refrigerant piping from an outdoor storage tank 2 is added to the refrigerant piping loop 6 of the air conditioning refrigerant loop. The coil 7 can be designed to be placed in any part of the tank and in operation of the storage system may be movable within the volume of the tank.

The expander/evaporator 3 is located inside or proximate to the room space 4 to be cooled while the compressor/condenser is located outdoors 5.

Appropriate valving is provided to operate different refrigerant circuits to conduct heat exchange between the three components 1,2 and 3.

There are two modes of operation for thermal storage. CHARGING and DISCHARGING. In the CHARGING mode, ice is made in the storage tank while in the DISCHARGING mode this formed ice is melted. Thermal energy is thus stored in the CHARGING mode and it is retrieved in the DISCHARGING mode.

Two interconnected refrigerant circuits accomplish the required thermal communication needed to perform CHARGING and DISCHARGING. During CHARGING, the refrigerant circulates between the compressor/condenser 1 and the internal coil 7 of the storage tank as part of a first thermal communication circuit. During DISCHARGING, the refrigerant circulates between the internal coil 7 of the storage tank and the expander/evaporator 3 in the room-space as part of a second thermal communication circuit.

CHARGING and DISCHARGING modes occur one after another and appropriate control for appropriate switching between the two circuits is provided.

Additionally, the system may also be designed such that room cooling can be done with or without participation by the thermal storage. With no participation, the refrigerant will circulate between the compressor/condenser 1 and the expander/evaporator 3 in the room-space as is typical in a typical split air-conditioner. When the thermal storage does participate, it can be in either CHARGING mode or DISCHARGING mode.

A circulating refrigerant between 2 and 3 is essential to extract heat from the room-space and send the heat to the thermal storage in the DISCHARGING mode. This requires pumping the refrigerant in a loop connecting the internal coils of the tank 7 and the coils of the expander evaporator 3. Hence room cooling using thermal storage of such design cannot be accomplished without a pump and power to circulate the refrigerant. In the event of power blackout, the room-space cannot be cooled with such a thermal storage system in a DISCHARGING mode.

FIG. 2 shows one embodiment of the improved thermal storage tank. The tank 2 shown is rectangular in shape with W width, L length and H height. The tank has an internal cooling coil 7. The coil has an inlet 21 and outlet 22 for the refrigerant. The tank has its outer surfaces 23 and 24 available for radiative heat exchange duty. The tank surfaces 23, 24 are made with the proper emissivity. Alternatively, custom panels can be added to any of the surfaces to achieve radiative duty. A single or plurality of surfaces can be provided. All outer surface areas of the tank not participating in any thermal exchange can be covered with adequate surface insulation. The exchange with the environment can be additionally augmented by providing structures on any surface of the tank to aid convective heat transfer. Fins 35 can provide convective air thermal transfer if desired. The fins can be arranged in any pattern, direction, material or shape, Without loss of generality, such a mode can advantageously use a pre-existing fan in the room space. The rectangular tank is just one embodiment of the shapes to be covered. The thermal storage tank can be of any shape, curved or flat.

During DISCHARGING, heat will flow from the room-space to melt the frozen PCM in this tank. The heat flux originating from the room-space will be either radiative and/or air-convective to the tank surface, followed by conduction through the tank wall and by liquid convection into the melting ice. No refrigerant is necessary for this heat transfer.

The heat exchange in room cooling during DISCHARGING is thus designed to be passive without any pumped refrigerant participating in the heat extraction from the room-space.

During CHARGING, refrigerant circulates between the compressor/condenser 1 and the coil 7 of the storage tank as part of one thermal communication circuit. During DISCHARGING as discussed above, there is no pumped refrigerant. The melting ice is put in thermal communication with the room interior through the exposed surface of the thermal storage tank and transfers the cooling in a conductive/convective/radiative thermal transfer regime to the room. No circulating refrigerant is used in the thermal energy transfer between the thermal storage and the room-space.

FIGS. 3(a) and 3(b) show embodiments of placements of thermal storage tank 2 in the room-space to be cooled. Tank placements are shown with reference to a section of the wall 31 defining the room space.

By advantageously locating the thermal storage tank itself either completely in the room-space or proximate to it, the need for the second thermal communication circuit using the refrigerant of current art is eliminated. Now there is only one refrigerant circuit, which is only used in the CHARGING mode.

In the embodiment as shown in FIG. 3(a), the thermal storage tank 2 is advantageously placed completely inside the room-space. It uses refrigerant-less radiative thermal exchange mode between the thermal storage and the room-space for its cooling of the room during the DISCHARGING. The tank's internal coil inlet 21 and outlet 22 are connected to the refrigerant circuit to the compress/condenser 1. The tank 2 is can be away or on the wall surface itself.

In another embodiment shown in FIG. 3(b) the thermal storage tank 2 is advantageously placed proximate to the room-space with the tank forming part of the wall 31 of the room-space and the contour of the surface 32 of the thermal storage flush with the wall surface. Alternatively, the tank width W can be such that it matches the wall thickness itself. Yet alternatively, width W can be thicker than the wall thickness such that the tank protrudes beyond either or both sides of the wall. In all of these configurations, a definite area of the tank surface is exposed to the interior of the room-space allowing the thermal exchange with the room without employing a refrigerant to conduct this heat exchange.

The tank can be designed to extend from the floor to the ceiling of a room, or it can be configured like a door of the room-space or it can be as wide as a room wall.

FIGS. 4(a) and (b) shows the heat flows in thermal storage with refrigerant in schematic form. Prior art FIG. 4(a) and one embodiment of our inventive design FIG. 4(b) are compared. Location of components is shown as being indoor or outdoor. The arrows indicate the direction of heat flow carried by the refrigerant.

In FIG. 4(a), refrigerant is circulated for the movement of heat in both of the CHARGING and DISCHARGING modes. During the CHARGING mode, heat is extracted from the PCM 8 in the storage tank 2 by the use of an evaporator coil, with the heated refrigerant carrying the heat to the compressor/condenser where the heat is released to the outdoor air. The PCM in thermal storage is thus cooled. During DISCHARGING the refrigerant flow takes the heat extracted from the indoors by the evaporator 3 and absorbed by the PCM in the thermal storage tank 2.

With one shown embodiment of our improved thermal storage shown in FIG. 4(b), only the CHARGING is done with the use of a refrigerant similar to prior art described above. However, the DISCHARGING is accomplished without the use of a refrigerant. No refrigerant flows during DISCHARGING. The thermal storage itself is in thermal communication with the room interior through radiant, convective or conductive transfer regimes. The heat is extracted from the room and absorbed by the PCM under the regimes without the use of a refrigerant in this portion of the heat transfer.

Isolated Space

The isolated space may be space for living, for live vegetation, animals or humans. Another application is cold storage for food and medication, to maintain their freshness, efficacy or extend usable lifetime. Any other applications that need cool temperatures for improved operation and lifetime, or other attributes, can also be served. The finite interior volume to be cooled is also alternatively called room-space, room, finite space, spatial volume, control volume of space.

Thermal Storage Tank

The thermal storage tank consists of a containment vessel filled with a thermal storage medium, enclosed in an insulating envelope. The insulating envelope can be integrated with the containment vessel.

As opposed to current art practice of placing thermal storage typically outside the room-space to be cooled, in a preferred embodiment, the inventive thermal storage is placed within an isolated space, akin to the placement of a bookshelf within a room (FIG. 3(a)). The inventive thermal storage may also be located proximate to the isolated space (FIG. 3(b)), akin to the placement of swamp cooler in an outdoor environment, with direct access to cool the isolated space. In the embodiment with the location within the isolated space, lower grade insulation may be utilized; the thermal storage will absorb heat more rapidly from the isolated space. The insulation constrains the absorption of heat, and "directs the flow" of absorption of heat. This is explained in subsequent paragraphs on heat transfer surfaces.

A vertical form factor of the thermal storage apparatus is beneficial, since it reduces its footprint. Footprint for a rectangular tank would be D×W. A horizontal form factor, similar to baseboard heaters is also beneficial due to its low profile. A form factor for ease of movement is beneficial for e.g. blocking sunlight from heating the isolated space, in the course of the day.

Portability and modularity of the thermal storage tank are also important considerations. If the tank has the proper weight it can be easily carried from one room-space to another. Additionally, ability to quickly and seamlessly connect with available refrigeration piping will enhance modularity.

Thermal Storage Medium

The thermal storage medium is a phase change material such as water. While water offers the advantage of low cost, other materials such as eutectic phase change compounds [refer Pluss Polymers] may also be used if they offer other advantages and are cost effective.

The latent heat of converting water to ice and vice-versa, is used beneficially during the CHARGING and DISCHARGING modes respectively, to reduce the mass and volume of the medium required to provide a desired Autonomous Cooling Period (ACP), for the isolated space.

Heat Transfer Modes Between the Tank and the Room-Space

A thermal storage device is advantageously located inside or proximate to a room-space that is to be cooled, with an outer heat transfer surface section capable of radiative heat transfer with the room-space that is to be cooled.

Heat transfer with the room-space can be aided by using convective means of heat transfer between the air and the surface of the thermal storage device. Some power may be required to drive air across the surface of the thermal storage in this design. Still, no power is required to circulate the refrigerant in this cooling mode as no refrigerant is used in such room cooling duty.

Significantly less energy is required for room-space cooling when radiative exchange is used to transfer energy between the room-space and the melting ice as opposed to when using refrigerant to do the same duty.

DISCHARGING Mode: Heat Transfer Surfaces

The heat transfer surfaces from the thermal storage apparatus to the isolated space, is located in thermal contact with the PCM storage medium. In one embodiment it may be integrated with the containment vessel, replacing some or all of the insulating shell. In another embodiment, the surface can be separate but proximate, with a path for conductive thermal coupling, e.g. when the thermal storage apparatus is outside but proximate to the isolated space.

During the DISCHARGING mode of operation the heat transfer surfaces utilize thermal transfer regimes selected from the group consisting of radiation, convection and conduction or any combination thereof, to absorb heat from the isolated space.

One or more such surfaces may be utilized, and their shapes may be flat, rounded, finned etc., as determined by the desired rate and direction of the thermal flow from the isolated space. For example, a flat surface absorbs radiant heat perpendicular to the surface. A curved surface has the benefit of absorbing radiant heat more uniformly from the isolated space.

A benefit of such embodiments is that cooling of the isolated space can be accomplished with or without ducts.

An embodiment that employs radiant thermal transfer, is shown in FIGS. 3(a) and (b). Heat is absorbed from the isolated space by radiation. This heat is transferred from the heat transfer surface to the stored ice by conduction and convection as the ice melts. No circulating refrigerants or refrigerant pumps are utilized. No forced air fans are utilized. This embodiment functions without utilizing any electrical energy during the autonomous cooling period. Thus in the case of zero primary electricity supply, there is no need for a secondary supply of electricity from e.g. a battery.

This embodiment will produce water condensation on the radiating surface: therefore a condensation management mechanism is necessary. An embodiment of this mechanism consists of sloping channels in the radiating surface that guide moisture to a common location for further removal. An alternate mechanism consists of constructing the heat transfer surface from glass or materials using hydrophilic coating. The wettability of the surface is thereby improved and a uniform surface appearance radiant surface may be desirable. Texturing the surface can also be done. Micro-replicated films can be used on the condensing surface for contouring.

An alternate embodiment employs forced air thermal transfer. Thermal energy is transferred from the stored ice to the transfer mechanism by conduction, and from the transfer mechanism to the cooled space by forced air, by utilizing a forced air fan external to the thermal storage apparatus. No circulating refrigerants or refrigerant pumps are utilized for ice to thermal transfer surface transfer. This beneficially spreads the cooling more uniformly through the isolated space. Herein, in the case of zero primary electricity supply, there is need for a small secondary supply of electricity from e.g. a battery. Since this embodiment also has a likelihood of producing water condensation on the radiating surface, a condensation management mechanism is necessary. An embodiment of this mechanism consists of sloping channels in the radiating surface that guide moisture to a common location for further removal.

A combination of radiant and forced air transfer for air conditioning is also beneficial. This requires a secondary source of electricity to drive the forced air fan. In many developing countries, battery based "inverters" are commonly used to mitigate against the unreliable grid. They provide sufficient electricity for lighting and fans, but not for air conditioning. An embodiment of the invention incorporates forced air transfer without requiring a secondary supply from an additional battery, but uses the "inverter" instead.

It is desirable to further control the rate of thermal transfer during the DISCHARGING mode. For example, the isolated space may be cool till the mid-morning, and may require no cooling, or reduced cooling from operation of the thermal storage apparatus operating in DISCHARGING mode. A mechanism comprised of a curtain, curtains, shutter or shutters that incrementally exposes the thermal transfer surfaces to the isolated space is utilized to achieve this. Since the radiant transfer rate is related to the area of the radiant transfer surface, the incremental placement of the mechanism, proportionately modulates the thermal transfer rate. In addition, this proportionately extends the duration of the DISCHARGING mode.

Charging Mode: Freezing the Thermal Storage Medium

The thermal storage medium within the thermal storage apparatus is frozen during the charging mode. In one embodiment, compressed refrigerant from a compression refrigeration unit is circulated through expansion coils enclosed within the thermal storage apparatus containing a phase change material such as water. The circulating refrigerant freezes the water.

The refrigeration unit can be based among others on vapor compression, thermoelectric, magneto-caloric or other technology that achieves the required cooling rate.

The refrigeration unit is sized so that if the thermal storage apparatus is operated in MIXED mode (i.e. simultaneous charging and discharging), there is a net accumulation of ice within the storage apparatus. The net accumulated ice is melted at some other beneficial time, e.g. when there is inadequate or no electricity.

The refrigeration unit may be powered by a continuous or intermittent source of electricity. In the charging mode, the refrigeration unit can operate at full capacity if there is adequate electricity. In the charging mode the refrigeration unit can operate at partial capacity if there is inadequate electricity. The refrigeration unit production of cooled refrigerant is proportional to the available electricity, up to the maximum capacity of the refrigeration unit. The electricity can be supplied by a renewable or non-renewable electricity source or any combination thereof. The electricity source may be grid connected or off-grid.

For example, the charging mode can be driven using electricity from a renewable electricity source such as an off-grid Solar photovoltaic system with or without battery storage. In the case of a battery-less system, maximum energy is extracted from the photovoltaic panels using maximum power tracking and this energy is delivered to the refrigeration unit. In the case of compression refrigeration, maximum energy is delivered to the refrigeration unit by use of a variable frequency motor, and maximum refrigerant is delivered to the thermal storage apparatus.

Some examples of charging scenarios include
1. Charge with Solar electricity during the day.
2. Charge with electricity when it is less expensive.
3. Charge when electricity is available.
4. Charge when there is excess electricity on the grid Some examples of discharge scenarios include
1. Discharge when electricity is not available.
2. Discharge at night, when there is no Solar electricity.
3. Discharge when electricity is more expensive
4. Discharge when electricity is available The size of the thermal storage tank will depend upon the cooling duty of the room-space desired. While the tanks can be sized for large duty as well as small duty, the proximate or interior siting of the tanks with respect to the cooled space preferentially goes in the direction of smaller duties. Locating such thermal devices in multi-story buildings will be more easily done with smaller sizes and footprints of the thermals storage tanks. The form factor will also need to be optimized for multi-story apartments Benefits The novel placement of the thermal storage apparatus proximate to the isolated space is beneficial for the following reasons.

This arrangement eliminates the need for a secondary refrigerant loop and associated pumps from the thermal storage to heat transfer mechanisms for cooling the isolated space. Zero electricity is required to cool the isolated space, when the thermal storage medium is cooler than the isolated space. Therefore, remote spaces can be served, where there is no grid electricity, intermittent electricity or inadequate electricity.

The "thermal transfer surface" is designed to operate close to the freezing point of water, below the dewpoint of the environment. Operating below the dew point reduces the size of the surface area required to achieve a given thermal transfer rate. This beneficially reduces the surface area of the exchange surface within the isolated space. Any resultant condensation on the thermal transfer surface is channeled to make it benign. This is a novel approach: current art avoids embodiments that operate at or below the dew point of the cooled space.

This embodiment enables the use of solar photovoltaic electricity. Solar electricity has the following attributes a) reduced electricity output when the sun is occluded by clouds, b) reduced electricity output during early, and late hours of the days, and c) No electricity after sunset and before sunrise. This embodiment enables the maximal use of Solar electricity. A combination of maximum power point tracking to harvest maximal electricity in the course of sunlight hours, and a variable speed compressor, that is sized to operate from a low threshold to the maximum output that the Solar PV can produce, is used.

This embodiment enables operation in regions with grid load shedding, i.e. since the system does not require any electricity when the thermal storage medium is cooler than the cooled space, it can continue to operate when the grid is down, without requiring a secondary source of electrify.

It may be difficult to deploy current art thermal storage tanks in locations where suitable outdoor space and safety is limited. The benefit of disclosed embodiment with a small footprint, and integrated radiative transfer surfaces is that it avoids outdoor deployment, since it can be unobtrusively placed within or proximate to the room space.

Additionally, there may be a need for the use of anti-bacterial, anti-foulants in the PCM used in the thermal storage tank. The PCM undergoes repeated use and cycling between temperatures and various impurities can accumulate in the cycling mass of the PCM.

This invention in beneficial at locations where central air conditioning is unsuitable.

Glossary of Select Terms

Mode State of operation of thermal storage system, three modes being defined—CHARGING, DISCHARGING, MIXED.
CHARGING mode: When the thermal storage tank loses heat energy to a heat sink and in doing so the phase change material in the tank cools and freezes. Mode can be either ON or OFF.
DISCHARGING mode: When the thermal storage tank gains heat energy from a heat source and in doing so the frozen phase change material heats up and melts. Mode can be either ON or OFF.
MIXED mode When the thermal storage apparatus gains heat energy from a source and simultaneously loses heat energy to a sink. Mode can be either ON or OFF.
Phase Change Material PCM A substance with a high heat of fusion which, melting and freezing at a certain temperature, is capable of storing and releasing large amounts of energy.
Refrigeration Cycle Traditional cooling of a refrigerant liquid in one location and heating of the same liquid at another location, resulting in a transfer of thermal energy between the two locations when the refrigerant circulates between a compressor and an expander. The refrigerant cools in the compressor and heats up in the expander. The refrigerant expands to pick up thermal energy and is compressed to release thermal energy.
Heat Transfer Rate The rate of thermal energy transfer. Also called Heat flux rate.
Footprint Square feet of floor area occupied by the thermal storage tank within the cooled space. Can also be expressed as a ratio of floor area occupied by the thermal storage tank and the area of the room-space to be cooled.
Thermal transfer regime Heat flux measured in units of $Btu/ft^2$-min is delivered in various scenarios of conduction, convection and radiation. These different pathways can be present simultaneously and is a function of physical condition and thermal equipment design. These pathways are referred to as regimes.
Autonomous Cooling Period (ACP) The longest discharging mode period after a complete charging mode period, e.g. the time required to completely melt the ice in the thermal storage apparatus, after the water in the thermal storage apparatus was completely frozen.

We claim:
1. A regenerative thermal storage system for cooling a room-space comprising
   a thermal storage tank holding a phase change material and having an internal cooling coil and having a portion of the tank outer surface located within or proximate to the room-space, wherein said outer surface of the storage tank is the principal pathway for heat exchange between the room-space and the phase change material; and
   a refrigeration cycle unit outside the room-space to provide refrigerant circulation to said internal cooling coil for cooling the phase change material; and wherein said thermal storage system operates in CHARGING, DISCHARGING and MIXED modes, and wherein said thermal storage tank is repositionable in the room-space.

2. The thermal storage system of claim 1 wherein during the CHARGING mode a refrigerant is circulated from said refrigeration cycle unit through said internal cooling coil to extract heat from the phase change material held in the storage tank to outside the room space.

3. The thermal storage system of claim 1 wherein during the DISCHARGING mode heat is transferred from the room-space into the phase change material without the use of any circulating refrigerant during this transfer.

4. The thermal storage system of claim 1 wherein the heat transfer rate in the DISCHARGING mode and the CHARGING mode is independently adjustable.

5. The thermal storage apparatus of claim 1 wherein said storage tank is thermally insulated, except for the outer proximate surface.

6. The thermal storage apparatus of claim 1 wherein said phase change material is selected from the group comprising organics, inorganics, eutectics, hygroscopics and mixtures thereof.

7. The thermal storage apparatus of claim 1 wherein said thermal storage tank is portable and modular.

8. The thermal storage system of claim 1 wherein an optimized heat transfer surface is thermally coupled by being integrated with the thermal storage tank, or by being placed in close proximity to the thermal storage tank.

9. The thermal storage system of claim 1, where in the storage tank comprises one or more tank outer surfaces, with shape and orientation of the surface or surfaces to enhance said heat exchange between the room space and the phase change material.

10. The thermal storage system of claim 1 wherein the heat extraction from said room-space by the thermal storage system uses a thermal transfer regime selected from the group consisting of radiation, convection and conduction or any combination thereof.

11. The thermal storage system of claim 1 wherein the temperature of said tank outer surface is at or below the dew point temperature of the room-space.

12. The thermal storage system of claim 1 wherein the charging is accomplished using electricity from both renewable and non-renewable sources or from any combinations thereof.

13. A thermal storage system of claim 1 wherein the melting of the phase change material in the thermal storage tank during the DISCHARGING mode is accomplished primarily with heat transfer between said tank outer surface of the thermal storage tank and the cooled room-space.

14. An improved method of operating thermal energy storage of claim 1 to cool a room-space comprising
  (i) Locating a thermal storage tank proximate to or in the room-space,
  (ii) cooling the thermal storage in a CHARGING mode with heat transfer between the thermal storage and the outdoor air,
  (iii) cooling the room-space in a DISCHARGING mode with heat transfer between the room interior and the thermal storage via the tank outer surface of the thermal storage tank.

15. The method of operating thermal energy storage of claim 14 where in said tank outer surface is at or below the dew point of the room-space.

16. The method of claim 14 where the cooling of the room-space during the DISCHARGING mode is accomplished without the use of power or with reduced power.

* * * * *